Sept. 1, 1925.
V. E. CLARK
MOLDED AIRPLANE WING
Filed Jan. 19, 1922     3 Sheets-Sheet 1
1,552,112
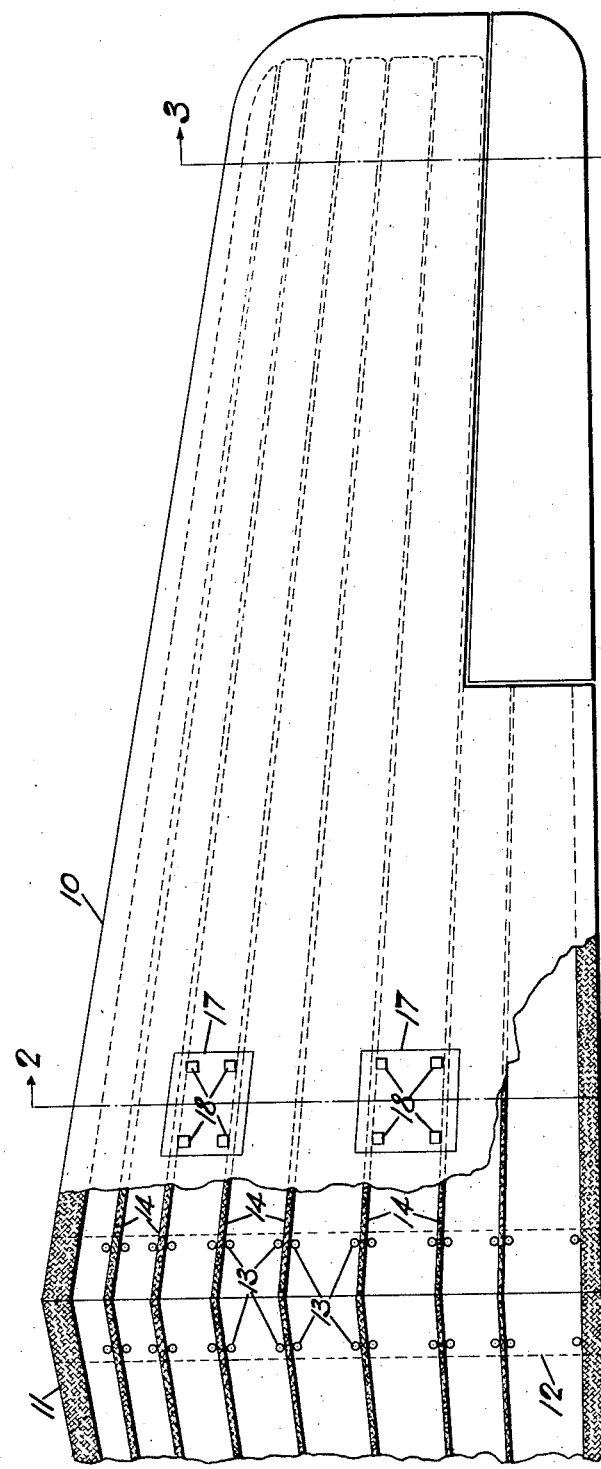
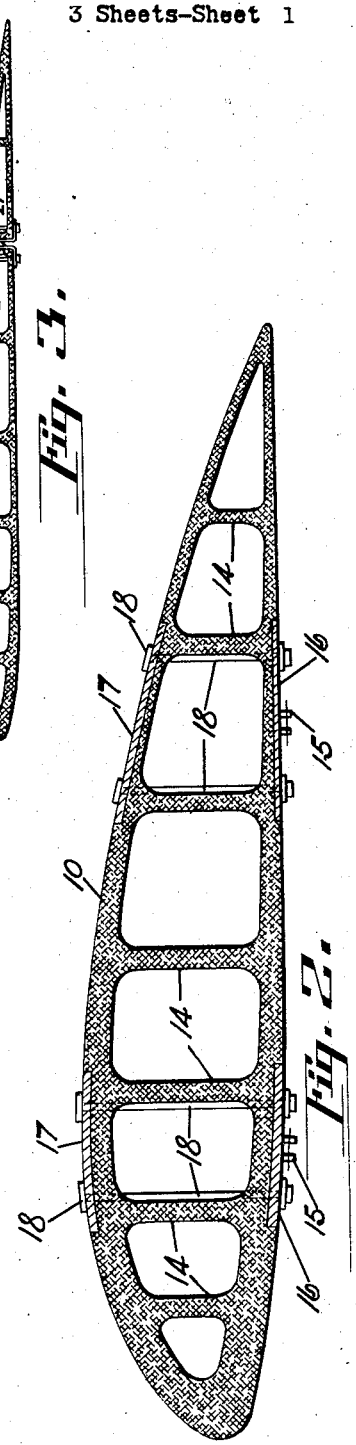
Witness.
By
Inventor.
Virginius E. Clark
Attorney.

Sept. 1, 1925.

V. E. CLARK 1,552,112

MOLDED AIRPLANE WING

Filed Jan. 19, 1922

Witness.
Elmer E. Freed
A. Bondar

By

Inventor.
Virginius E. Clark
Ralph H. Chilton
Attorney.

Sept. 1, 1925.  
V. E. CLARK  
1,552,112

MOLDED AIRPLANE WING

Filed Jan. 19, 1922  3 Sheets—Sheet 3

Witness.  
Elmer E. Freed  
A. Bondar

By

Inventor.  
Virginius E. Clark  
Ralph H. Chilton  
Attorney.

Patented Sept. 1, 1925.

1,552,112

UNITED STATES PATENT OFFICE.

VIRGINIUS E. CLARK, OF DAYTON, OHIO, ASSIGNOR TO DAYTON-WRIGHT COMPANY, OF DAYTON, OHIO, A CORPORATION OF DELAWARE.

MOLDED AIRPLANE WING.

Application filed January 19, 1922. Serial No. 530,433.

*To all whom it may concern:*

Be it known that I, VIRGINIUS E. CLARK, a citizen of the United States of America, residing at Dayton, county of Montgomery, and State of Ohio, have invented certain new and useful Improvements in Molded Airplane Wings, of which the following is a full, clear, and exact description.

This invention relates to molded airplane wings and other aerofoil surfaces and is especially applicable to that type of wing whose section varies in thickness along the length of the wing. Ordinarily in internally braced wings, the thickness of the section is much greater at the point of attachment of the wing to the airplane body in order to take the greater bending moment at this point, but the section is gradually tapered down to a much thinner section out near the tip in order to obtain greater aerodynamic efficiency. The construction of such a tapered wing by means of spars and ribs is very complicated and expensive since the ribs vary in size and shape and the spars are not of uniform section throughout their length. The general object of this invention is to provide a molded wing which can be constructed more quickly and cheaply than the built-up form of wing, regardless of whether the wing is of uniform or variable section.

Another object is to provide a molded wing having reinforcing members therein of relatively great strength and located at or near the places where the greatest stresses occur.

Another object is to provide cored passages running lengthwise in the molded wing which greatly reduce the weight but do not materially reduce the bending strength of the wing.

Another object is to provide means for attaching fittings to the molded wing so that the force upon the fitting is distributed over a relatively large area, thereby reducing the tendency to rupture the molded material of which the wing is composed.

Further objects and advantages of the present invention will be apparent from the following description, reference being had to the accompanying drawings, wherein preferred forms of embodiments of the present invention are clearly shown.

In the drawings:

Fig. 1 is a plan view of a variable section monoplane wing, with the upper surface broken away in part, and showing a method by which the wings may be attached to the fuselage of the airplane.

Fig. 2 is a section on line 2—2 of Fig. 1, showing means by which center section struts may be fastened to the wing.

Fig. 3 is a section on line 3—3 of Fig. 1, showing means for fastening aileron hinges.

Similar reference characters refer to similar parts throughout the various views of the drawings.

Figure 4:
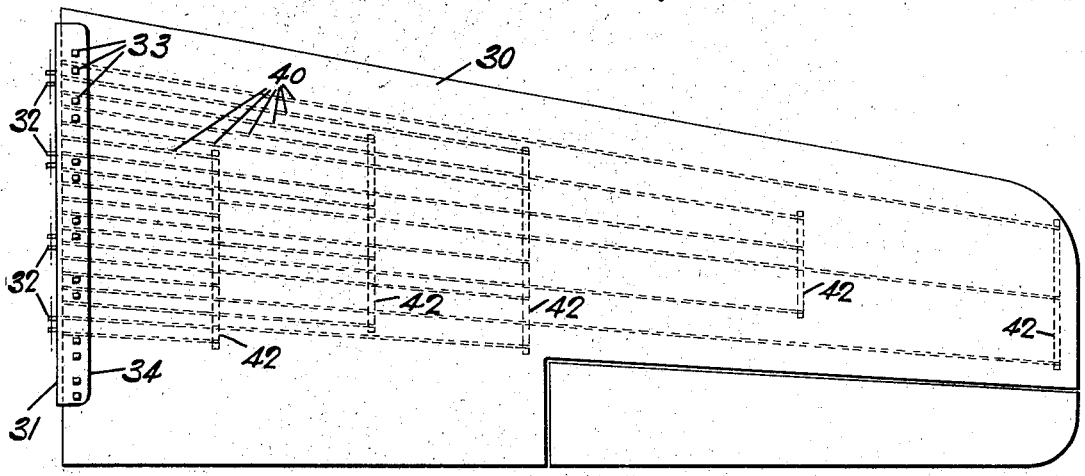
Fig. 4 is a somewhat diagrammatic plan view of a molded wing and showing in dotted lines the distribution of the reinforcing wires located near the bottom surface as shown in Figs. 5 and 6.

In Figs. 1, 2 and 3 there is illustrated an internally braced cantilever airplane wing 10. This particular wing is also tapered in plan form, however, if desired, it may be of uniform chord. In Fig. 1 there is also shown a portion of the left wing 11, which abuts the thick end of the right wing 10 and is attached thereto by means of a bottom plate 12 and a top plate (not shown), these two plates being firmly bolted together by bolts 13 which preferably are located close up against the webs 14 as illustrated. These plates 12 may be made of either wood or metal as desired, dependent on the weight and strength considerations in the design of the particular airplane on which this invention is used. The wings 10 and 11 thus firmly bolted together may be attached to the body of the airplane at the fittings 15 (see Fig. 2). These fittings 15 are securely fastened by any desired means to the bottom plates 16 which in turn are firmly bolted to similar top plates 17 by means of the bolts 18. It is thus seen that when either tension or compression forces are applied to fittings 15 the force is distributed by the plates 16 and 17 over a considerable area of the wings and thus reduces this maximum stress to which the molded material is subjected. The plates 16 and 17 may be made of either wood or metal, as in the case of plate 12, and be of such dimensions as to properly distribute the maximum forces applied at the fittings 15. In the case of a biplane having these molded wings the strut fittings and wire pulls could of course be attached to the top plates 17 also.

Fig. 3 illustrates a method of attaching the aileron hinge fittings 20. Preferably these fittings 20 extend over the top and bottom of surfaces of the wing and are held in place by the through bolts 21. The hinge fittings 20 as well as the plates 16 and 17 may be either molded in place and bolted after withdrawing the cores, or inserted after the wing is taken from the mold.

Figure 5:
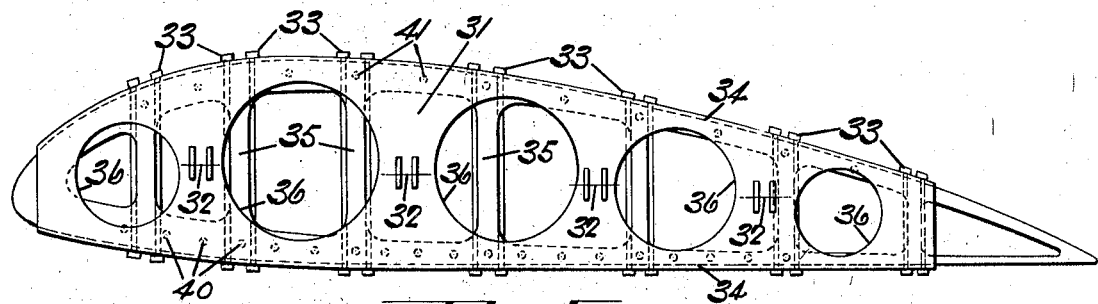
Fig. 5 is an end view of the wing shown in Fig. 4 and showing a method of attaching a hinge fitting to the wing.
Figure 6:
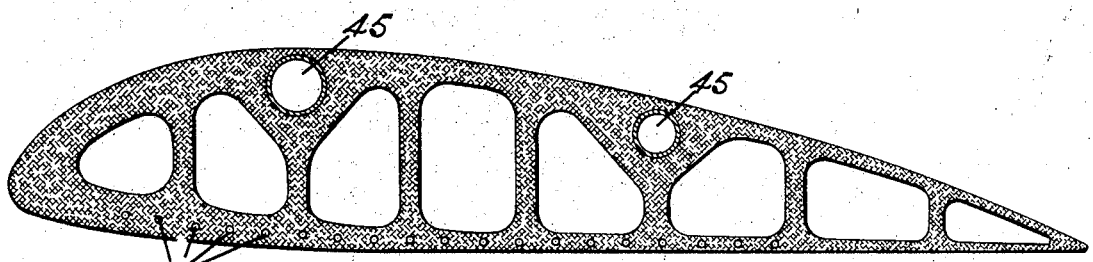
Fig. 6 is a section through a modified form showing reinforcing wires near the bottom surface for taking the tension in flight, and reinforcing tubes near the top surface for taking the compression in flight and tension in landing.

In Fig. 4 the molded wing 30 is designed to be hinged to its support by the hinge fitting 31 which is provided with a plurality of hinge pins 32. This fitting 31 is provided with flanges 34 overlapping the top and bottom surfaces of the wing section, the flanges being bolted together by through bolts 33 preferably arranged close against the webs 35 (see Fig. 5). By this means the wing is firmly supported in the hinge fitting 31 throughout approximately its entire chord. The fitting 31 preferably is provided with the lightening holes 36 which may be of any desired shape, such as circular or patterned with the cored passages. In Figs. 4, 5 and 6 the reinforcing wires 40, preferably of steel, are molded in the wing to greatly increase its tensile strength along its lower portion since the lower portion of the wing section is under tension during flight. Fig. 4 illustrates diagrammatically a method of distributing these reinforcing wires so that the number of wires at any section is approximately proportional to the bending moments in the wing at that section during flight. The arrangement of the wires illustrated is of course for a cantilever wing wherein the greatest bending moment is adjacent the support.

If desired, reinforcing wires may also be provided along the top portion of the wing as shown at 41 in Fig. 5 to take the tension during opposite bending, which occurs upon landing or during inverted flight. The wires 40 or 41 are preferably anchored in the molded material by means of the anchor bars 42 spaced somewhat as shown in Fig. 4 and lying directly transverse or diagonally transverse the wing.

Fig. 6 illustrates a modification wherein the upper portion of the wing is provided with reinforcing metallic tubes 45, preferably steel, which can take both the compression occurring during ordinary flight, and the tension occurring during inverted flight or in landing.

Figure 7:
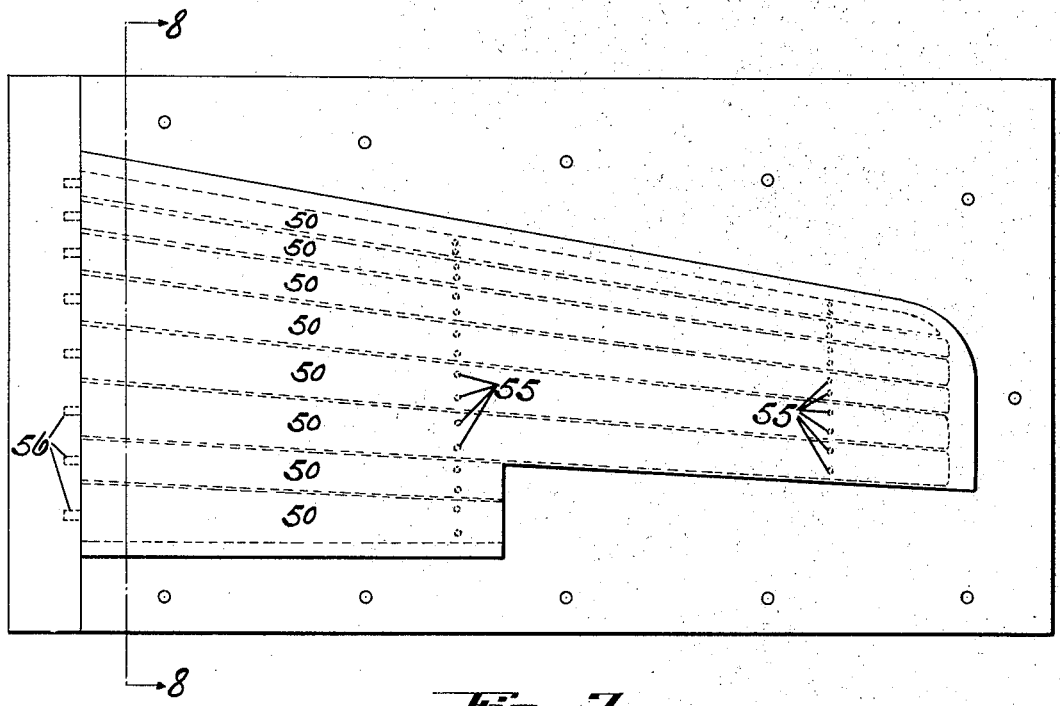
Figs. 7 and 8 are diagrammatic views showing the arrangement of the cores in the mold and the manner in which the cores may be supported in place, Fig. 8 being a section on line 8—8 of Fig. 7.
Figure 8:
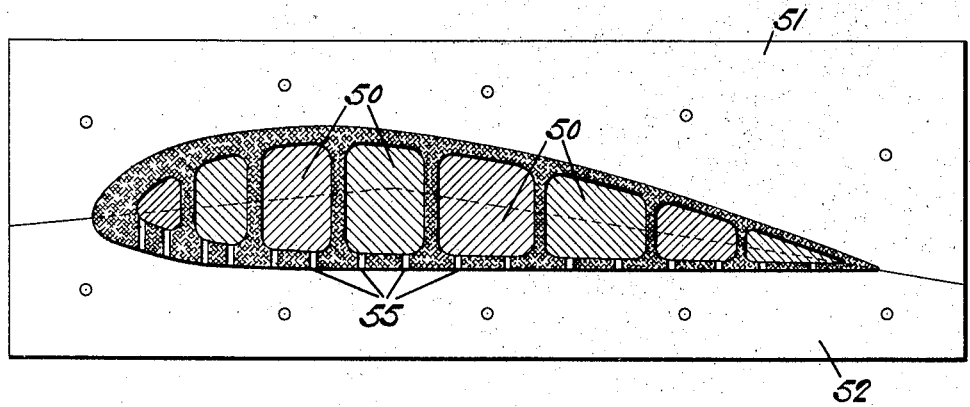

Figs. 7 and 8 illustrate diagrammatically the method of supporting the tapered cores 50 within the molds 51, 52 by means of the short supports 55 which may be withdrawn when the molded wing is removed from the mold and the holes plugged up by any suitable means. The large ends of the tapered cores 50 may be secured in place and supported by being provided with short projections or lugs 56 which fit into cooperating recesses in the end mold piece. After molding the wing the cores 50 are capable of being withdrawn from the open end since they are all tapered as shown in dotted lines in Fig. 7.

The material from which the wing is molded is preferably rubber with high sulphur content to give it strength and rigidity. The material may be forced into the mold in a viscous state and mixed with a gas, the whole being put under pressure while the material is heated to keep it in a viscous condition, and the mold quickly cooled while the pressure is suddenly removed creating a great number of minute hollow cells or blow holes. In short, the general process is to introduce into the material a great number of minute hollow cells which change its general structure from a plastic material into a very porous material which attains a permanent set, thereby giving a low specific gravity yet maintaining good strength and rigidity.

The process may be readily carried out from the description given above by one skilled in the art.

The wing may also be molded from the well known material bakelite, the size of the lightening passages being preferably increased to reduce the weight. Also long fiber wood pulp, paper pulps, or other material which would permit the process may be used so long as the material would give in the finished state a high value of strength for its specific gravity.

While the forms of mechanisms herein shown and described, constitute preferred forms of embodiments of the present invention, it is to be understood that other forms might be adopted, all coming within the scope of the claims which follow.

What I claim is as follows:

1. A molded airplane wing having a plurality of longitudinally tapered cored passages extending lengthwise therein whereby the wing may be made lighter without materially decreasing its longitudinal bending strength.

2. An integrally molded internally braced aerofoil having a plurality of stiffening ribs extending lengthwise therein whereby the longitudinal bending strength of the wing is greatly increased.

3. A molded aerofoil having a plurality of tapered cored passages extending lengthwise therein and a plurality of reinforcing members of relatively high tensile strength imbedded therein.

4. A molded aerofoil having a plurality of reinforcing tension members therein near its lower surface.

5. A molded aerofoil having a plurality of reinforcing tension members therein near its lower surface, said tension members being so located as to give the aerofoil approximately uniform strength when under flight load.

6. A molded aerofoil having reinforcing members of relatively high strength located substantially at its lower and upper surfaces whereby the longitudinal bending strength of the aerofoil is greatly increased.

7. A molded aerofoil having a plurality of reinforcing tension members near its lower surface and a reinforcing compression member near its upper surface.

8. A molded aerofoil having longitudinal reinforcing members therein, said members being located in said aerofoil substantially near the surface thereof.

9. A molded aerofoil having a plurality of longitudinal reinforcing tension members therein near its lower surface, said tension members varying in lateral spacing at points along the length of the aerofoil approximately according to the bending moment stresses upon the aerofoil.

10. A molded aerofoil having a plurality of longitudinal reinforcing tension members therein near its lower surface, and a member extending transversely of said aerofoil by means of which said tension members are anchored.

11. A molded aerofoil having a plurality of longitudinal reinforcing tension members therein near its lower surface, and a plurality of spaced members extending transversely of said aerofoil by means of which said tension members are anchored.

12. A molded aerofoil having a plurality of laterally spaced longitudinal reinforcing members and a plurality of transverse members by means of which said longitudinal members are anchored in place.

13. An integrally molded aerofoil of cellular rubber composition and having reinforcing members embedded therein.

In testimony whereof I hereto affix my signature.

V. E. CLARK.